Nov. 11, 1930. C. D. HELM 1,781,227
PRESSURE RELIEF DEVICE
Filed Sept. 15, 1928
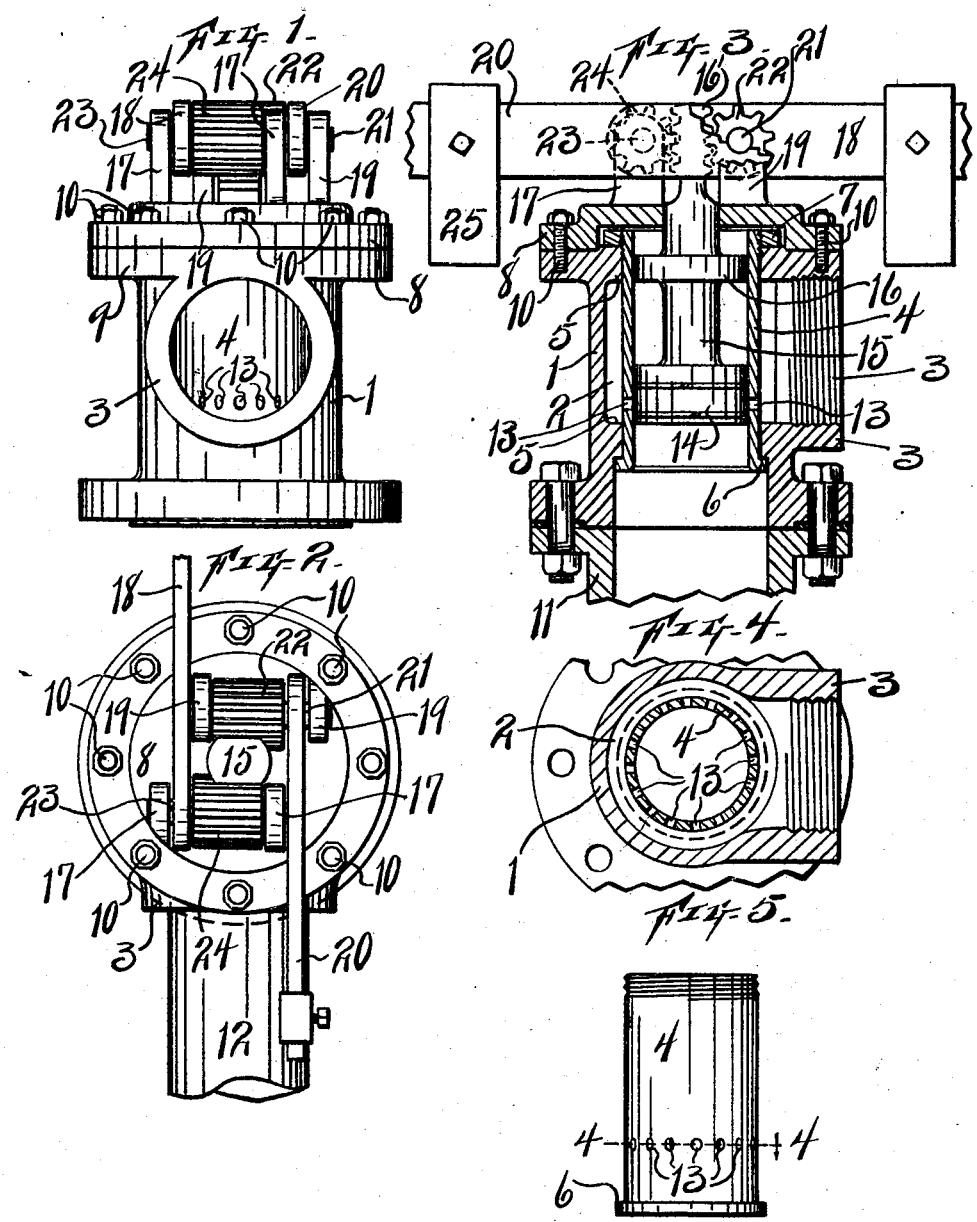
INVENTOR
CLYDE D. HELM.
BY
A. D. Jackson
ATTORNEY Patented Nov. 11, 1930

1,781,227

UNITED STATES PATENT OFFICE

CLYDE D. HELM, OF FORT WORTH, TEXAS

PRESSURE-RELIEF DEVICE

Application filed September 15, 1928. Serial No. 306,254.

My invention relates to by-pass pressure relief valves and more particularly to automatic pressure relief valves; and the object is to provide valves which are simple in construction and operation and which will serve to relieve pressure in supply pipe lines without the attention of an operator. Other objects and advantages will be fully explained in the following description and the invention will be more particularly pointed out in the claims.

Reference is had to the accompanying drawings which form a part of this application.

Fig. 1 is a side elevation of the valve.

Fig. 2 is a plan view of the same.

Fig. 3 is a vertical section of the casings.

Fig. 4 is a horizontal section, taken on the line 4—4 of Fig. 5.

Fig. 5 is a side elevation of the valve cylinder or barrel.

Similar characters of reference are used to indicate the same parts throughout the several views.

The valve is provided with a casing 1 which serves as a supporting frame. The casing 1 is cored out in the interior to form a passage 2 for the passage of oil or other liquid out through the discharge 3. A cylinder 4 is mounted in the casing 1 and guided and held in place by two annular shoulders 5 which are formed as a result of coring out the casing 1. The cylinder 4 is fixedly locked in place by an annular flange 6 and by a nut 7 which is screwed on the cylinder above the upper shoulder 5. The casing 1 is provided with a cap 8 which is attached to a flange 9 by screw bolts 10. The casing 1 is in communication with the main flow or supply line by means of a connecting pipe 11 and the discharge is adapted to discharge into a waste line or over flow line 12 which will deliver the oil or other liquid forced through the casing 1 to a reservoir so that pumps can force the overflow back into the main supply line (not shown). The cylinder 4 is provided with a plurality of discharge ports 13 which discharge the excess oil or other liquid into the annular passage 2.

A piston or plunger 14 is mounted in the cylinder 4 and moves vertically therein. This piston is provided with a stem or piston rod 15. This piston rod 15 is provided with an annular flange 16 which serves as a guide for the movement of the piston 14. The rod rod 15 is adapted to move freely through the cap 8, the cap not being air-tight. The piston rod 15 has racks 16 formed on opposite sides thereof. Means are provided for retarding and controlling the upward movement of the piston 14. Fulcrum bearings 17 are formed on the cap 8 for the lever 18 and fulcrum bearings 19 are formed on the cap 8 for the lever 20. A fulcrum 23 for lever 18 is pivotally mounted in the bearings 17 and a pinion 22 is rigid with the fulcrum 21 and meshes with a rack 16' on the piston rod 15. A fulcrum 21 for lever 20 is pivotally mounted in the bearings 19 and a pinion 24 is rigid with fulcrum 23 and meshes with a rack 16. The pinion 22 and its fulcrum 21 are rigid with the lever 20 and the pinion 24 and its fulcrum 23 are rigid with the lever 18. Weights 25 may be adjustably mounted on the levers 18 and 20 if necessary. The weights can be moved more or less on the levers 18 and 20 to adapt the levers to afford the required resistance.

The pressure in supply lines sometimes becomes too great by reason of too much oil being forced through the lines and this pressure must be relieved. In the operation of the valve above described, when the pressure is becoming too great, the oil coming through the pipe 11 will force the piston 14 upwardly and past the ports 13. As soon as the ports 13 are opened the liquid will commence to flow through the ports 13 into the annular cavity 2 and out through the discharge 3 and through the waste or relief pipe 12. This liquid will be delivered to a tank or reservoir from which the pumps will draw the same into the supply line again. The levers 20 and 18 with their weights 25 tend to hold the piston 14 down. In forcing the piston 14 upwardly, the pressure must be sufficient to raise the outer ends of the levers 18 and 20 with their weights 25 by reason of the rack and pinion connection above described. As the pressure in the supply line decreases the piston 14 will be forced downwardly by the levers 18 and 20 and their weights 25. The relief valve thus works automatically to maintain the required pressure in the supply lines.

What I claim, is—

1. A pressure relief device comprising a casing having intake and discharge ports, a cylinder mounted in said casing, said casing having an annular cavity therein communicating with said discharge port, means for locking said cylinder in said casing including an interior flange in said casing and an exterior flange on said cylinder and a nut screwed on said cylinder and clamping said flanges together, said cylinder having ports communicating with said cavity, a piston mounted in said cylinder and adapted to open and close said cylinder ports automatically for relieving excessive pressure in a supply line and conserving the liquid, and means for regulating the movement of said piston.

2. A pressure relief device comprising a casing having intake and discharge ports, a cylinder mounted in said casing, said casing having an annular cavity surrounding said cylinder and communicating with said discharge port, means for locking said cylinder in said casing including an interior flange in said casing and an exterior flange on said cylinder and a nut screwed on said cylinder and clamping said flanges together, said cylinder having ports communicating with said cavity, a piston mounted in said cylinder and adapted by pressure of passing liquid to open and close said cylinder ports automatically, a piston rod for said piston projecting out of said casing and racks formed on opposite sides of said rod, and levers fulcrumed on said casing and provided with pinions rigid therewith adapted to engage said racks.

3. A pressure relief device comprising a casing having intake and discharge ports, a cap closing one end of said casing, a cylinder mounted in said casing, said casing having a cavity surrounding said cylinder and communicating with said discharge, said cylinder having a plurality of discharge ports into said cavity, a piston movable in said cylinder and adapted by pressure of passing liquid to open and close the ports therein automatically for relieving excessive pressure in a supply line and conserving the liquid, a piston rod for said piston movable freely through said cap and provided with racks on opposite sides thereof, two pairs of bearing members formed on said cap, fulcrum shafts journaled in said bearing members and pinions rigid with said shafts and adapted to engage said racks, and levers rigid with said shafts and actuated thereby.

4. An automatic pressure relief device comprising a casing connected to a supply line, a cylinder fixedly mounted in said casing, said casing having a circular cavity therein about said cylinder and having a waste discharge connection and said cylinder having discharge ports communicating with said cavity, a piston moving vertically in said cylinder for opening and closing said cylinder ports automatically for relieving excessive pressure in a supply line and conserving the liquid, racks formed on said piston, bearing members rigid with said casing, pinions provided with fulcrum shafts rigid therewith and journaled in said bearings, and levers provided with adjustable weights and rigid with said shafts.

5. A pressure relief device comprising a casing having intake and exhaust ports, a cylinder mounted in said casing and provided with an exterior flange, said casing having an annular cavity therein communicating with said discharge port and an annular flange below said cavity, means for locking said cylinder in said casing, including means for clamping said cylinder flange against said casing flange, said cylinder having ports communicating with said cavity, a piston mounted in said cylinder and adapted to open and close said cylinder ports automatically for relieving excessive pressure and conserving the liquid, and means for guiding said piston including a piston rod rigid with said piston and an annular flange on said rod and movable in said cylinder.

6. A pressure relief device comprising a casing having intake and exhaust ports and an annular interior cavity therein and an annular interior flange below said cavity, a cylinder mounted in said casing and provided with ports communicating with said cavity and having an annular exterior flange engaging the interior flange of said casing, means for forcing said cylinder flange against said casing flange, a piston provided with a rigid stem and a cylindrical guide flange rigid with said stem mounted in said cylinder, and means for retarding the movement of said piston during excessive pressure and for quickly restoring the piston to normal position after the pressure is relieved.

In testimony whereof, I set my hand, this 12th day of July, 1928.

CLYDE D. HELM.